Nov. 13, 1962    B. D. SUTHERLAND    3,063,481
POWER SAW GUARD RETRACTOR
Filed Aug. 7, 1961
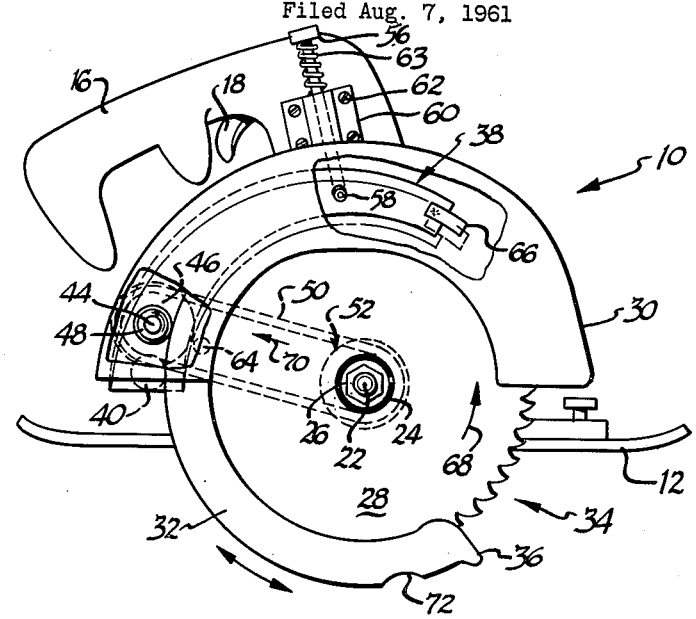
FIG. 1
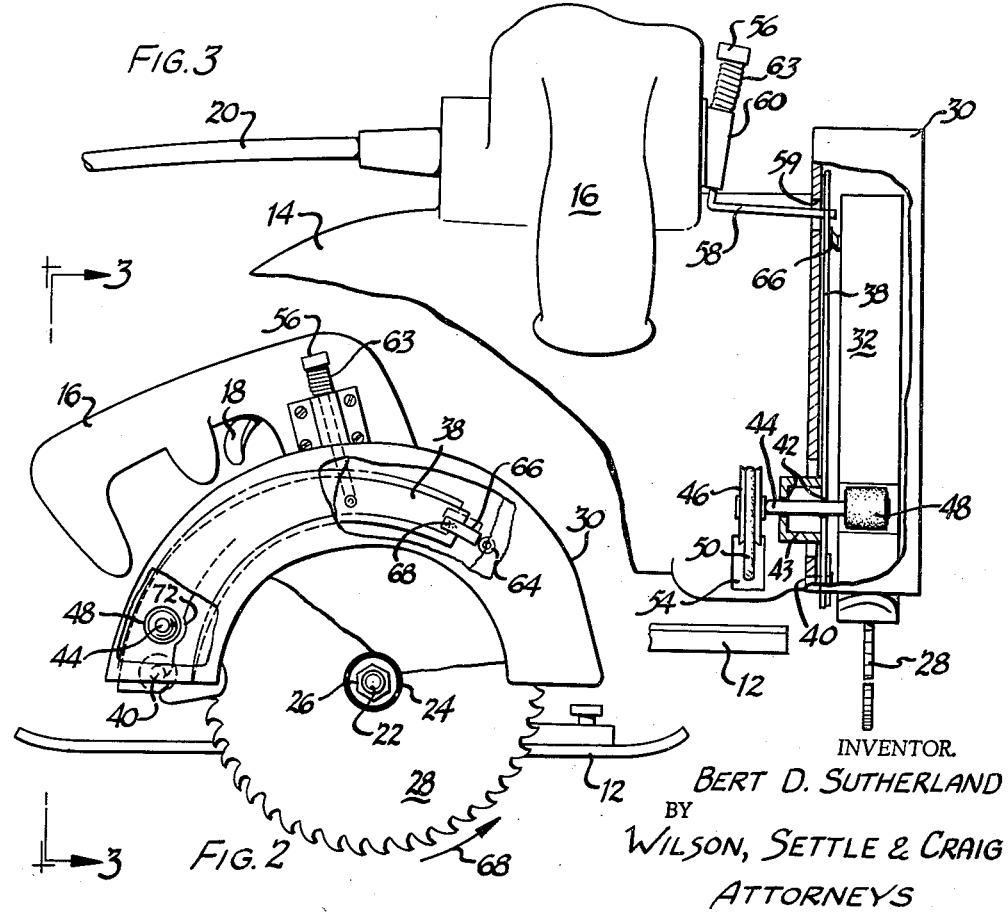
FIG. 3
FIG. 2
INVENTOR.
BERT D. SUTHERLAND
BY
WILSON, SETTLE & CRAIG
ATTORNEYS United States Patent Office 3,063,481
Patented Nov. 13, 1962

3,063,481
POWER SAW GUARD RETRACTOR
Bert D. Sutherland, Pontiac, Mich., assignor of fifty percent to Lee R. Sutherland, Pontiac, Mich.
Filed Aug. 7, 1961, Ser. No. 129,721
6 Claims. (Cl. 143—159)

This invention relates to power saws and more particularly to electrically powered hand saws of the rotary type incorporating a guard retractor mechanism whereby the guard can be selectively retracted utilizing power from the drive motor.

Power saws of the hand type are provided with spring loaded guards of arcuate form which swing into position beneath a saw blade to substantially completely enclose the teeth of the blade, with the exception of a small lower forwardly facing segment of the blade adapted to engage stock to be cut, to prevent accidental contact of the teeth of the blade by the fingers or other parts of the body of a workman manipulating such a device. The upper part of the blade is also encased within a protective guard or housing and is adapted to slidably and arcuately receive the spring loaded guard as the saw moves into the work and the guard is forced rearwardly by contact with the work.

However, there are many instances where a retractable guard over the saw blade of a portable electric saw interferes with the work being done to such an extent that operators of these saws often remove these guards, block them up, or tie them in an open position. Also, there are instances where the operator must remove one hand from the saw in order to raise the guard to a position where it will not interfere with the work. This is a very dangerous procedure.

It will therefore be observed that an improved mechanism for conveniently and safely retracting a saw guard to prevent its hindering the operation of the saw in tight working conditions, would provide a substantial advance in the art of hand operated power saws and would substantially improve the safety factor provided by a saw guard, if such guard could be actuated at the will of the operator of the tool.

The present invention therefore provides a device to improve the safety of a guard over the saw teeth at all times when needed; and also to immediately and efficiently retract the guard to a position where it does not interfere in any way with the efficient operation of the saw.

It is accordingly an important object of the present invention to provide an improved and versatile power hand saw guard retracting mechanism.

Another important object of the present invention is to provide an improved electric hand saw guard retracting mechanism, adapted to be readily fitted to saws utilizing arcuately retractable blade guards.

A still further object is to provide an improved saw guard retracting device for electric powered hand saws wherein power for retracting the guard is available only when the saw is actuated thereby providing a substantial safety factor in the operation of a saw.

A further object is to provide an improved electric hand saw guard retracting mechanism utilizing few working parts of durable construction and adding very little to the cost of the saw in proportion to the additional safety factor provided.

A still further object is to provide an improved electric hand saw guard retracting device wherein the guard is positively and smoothly retracted, or returned to a normal guarding position at the will of the saw operator by application or release of thumb pressure to an actuating button located adjacent the switch, whereby the hand controlling the guard cannot be moved into accidental blade contact.

A still futrher object is to provide a saw retracting device wherein the moving parts are in engageable relationship only during retraction of the guard and thus wear of the rotating parts of the device is retained at the minimum.

A still further object of the invention is to provide a saw guard retracting device wherein the guard only remains retracted as long as the operator retains his thumb on the actuating button of the guard, thereby automatically preventing inadvertent retraction of the guard to expose the operator to the hazard of the sharp and rapidly moving cutting edges of the powered saw blade.

Other objects of this invention will appear in the following description and appended claims, reference being had to the accompanying drawings forming a part of this specification wherein like reference characters designate corresponding parts in the several views.

In the drawings:

FIGURE 1 is a side view of an electric hand saw having the guard retracting mechanism of the present invention incorporated in its structure and showing the retracting mechanism in an inoperative position with the guard in its extended position;

FIGURE 2 is a side view similar to FIGURE 1 showing the retracting mechanism in an actuated position and the guard in a retracted position; and FIGURE 3 is a rear elevational view taken along the line 3—3 of FIGURE 2 and showing the back of the upper blade guard partially broken away to better illustrate the retracting mechanism of the present invention with the lower guard in a retracted position within the upper guard.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

*Brief Perspective*

The saw guard retractor of the present invention broadly includes a lever, preferably of arcuate form, pivoted at one end and concealed within the upper saw blade housing of a power saw. The pivoted lever carries a driving wheel, powered from the saw motor and adapted to be moved into engagement with the back of the retractable arcuate saw guard upon pivoting movement of the lever to move the guard to a retracted position, where it is automatically locked and the power wheel is simultaneously and automatically disengaged from the movable saw guard to prevent wear of the power wheel. Release of an actuating thumb button located on the saw handle, beneath the operator's thumb returns the guard to its normal position without wear between moving parts.

*The Environment*

As shown in the drawings, the saw guard retractor of the present invention is adapted to be utilized with a power saw 10 of the manual type, that is where the saw is lifted and moved and operated along a cutting line by grasping the saw handle with the hand. The saw 10 includes a base member 12 upon which is mounted a motor housing 14, FIGURE 3, within which is contained an electric motor, generally of the universal type (not shown). On the top of the motor housing 14 there is provided a handle 16 within which is housed an electric switch having an actuating lever 18, FIGURES 1 and 3, of the type adapted to close a circuit and thereby deliver current only as long as the handle 16 of the saw is grasped and the switch lever 18 is depressed by an operator's finger. Accidental starting is thereby avoided. Electric current is fed to the motor of the saw by a conduit 20 that leads into the forward portion of the handle 16 housing the electric switch, previously mentioned.

Enclosed within the motor housing 14, there is provided a set of reduction gears (not shown) and support bearing for a shaft 22 that extends out of the housing to the right, looking at FIGURE 3 to provide an exposed end.

The exposed end of the shaft 22 is threaded and shouldered and a threaded washer 24 having a hex surface 26 thereon for receiving a wrench is tightened on the shaft 22 to retain a saw blade 28. Attached to the motor housing 14 and positioned to lie above the upper half of the saw blade 28, there is provided an upper shield member 30 on half-circle configuration and of generally U-shape in cross section that is adapted to cover the tooth perimeter of the saw blade 28. The upper shield 30 is suitably secured to the motor housing 14 by screws or the like (not shown) or in some instance may be partially cast with the housing. A retractable saw guard 32 is also provided to normally underlie the lower portion of the saw blade, which extends below the base 12 to cut stock across which the base is moved. This retractable guard consists of an arcuate shaped member of generally U-shaped configuration in section, and is adapted to fit within the upper guard 30. Although not shown, to avoid confusing the issues, the lower guard 32 is provided with an arm extending to a coil spring housing positioned in a known manner adjacent the shaft 22, to pivotally urge the guard 32 downwardly to the protective position shown in FIGURE 1. This leaves an exposed portion 34 of the saw blade 28, that is adapted to engage lumber to be cut and shortly after entry, the front portion 36 of the guard 32 is adapted to engage the stock and move the guard through an arcuate path up into the upper guard 30 to be retained therein as long as the saw is cutting stock. When the cutting operation is finished and the portion 36 no longer engages the stock, the guard 32 is spring biased back to its normal position shown in FIGURE 1. The guard 32 is shown illustratively retracted in FIGURE 2 with the lower portion of the saw blade exposed for cutting.

*The Novel Guard Retractor*

The guard retractor of the present invention centers around an actuating lever 38 that is preferably of arcuate shape as shown in FIGURE 1 and of generally flat blade configuration as shown in FIGURE 3. The lever 38 is pivoted at its lower end on a pin 40, fastened to the rear bottom portion of the upper guard 30 on the left side thereof, as shown in FIGURE 3, over to one side of the movable guard 32 so that the guard 32 may move up into the upper guard 30 without interference.

As best shown in FIGURE 3, bearings 42 are fitted into a bracket 43 carried by the actuating lever 38 just above the pivot pin 40. The bracket projects through a suitable opening in the inner wall of guard 30. A shaft 44 is passed through the bearing 42 and is fitted at its left end with a small V-pulley 46 and is fitted at its right end with a rubber covered drive roll 48. The V-pulley 46 is connected by means of a belt 50 to a small V-pulley 52 carried by the shaft 22, on the inside of the saw blade. If necessary, the motor housing is cut away a bit as at 54 to permit free movement of the belt 50. Thus it will be seen that when the motor is actuated to drive the saw blade 28, the shaft 44 will be rotated by means of the belt 50 and the pulleys 52 and 46 to drive the rubber covered drive roll 48.

As mentioned, the actuating lever 38 is pivoted at its lower end on a pin 40. As shown in FIGURE 1, the actuating lever 38 is adapted to be moved between two positions, namely the solid line position and the dotted line position. The solid line position represents the non-actuating position and the dotted line position represents the actuating position of the lever. For actuation of the lever, a thumb button 56 is provided on the upper end of an L-shaped actuating rod having the upper arm thereof passed through an apertured bracket 60, fastened to the side of the handle 16 as by screws 62 or the like. A spring 63 is positioned on the upper arm of the L-shaped actuating rod 58 between the thumb button 56 and the upper part of the bracket 60 to urge the arm 58 to a normally upward or solid line position. The horizontal arm of the actuating rod 58 extends through an appropriate slot 59 provided in the left hand wall, FIGURE 3, of the upper guard housing 30 and through an aperture provided in the upper end of the arcuate actuating lever 38. Thus, the lever 38 is normally retained in its non-actuating or solid line position as shown in FIGURE 1, but may be pressed at will by means of the button 56 and the rod 58 downwardly to occupy the actuating or dotted line position of FIGURE 1.

Before describing the operation of the present mechanism, it should be pointed out, by reference to FIGURE 1, that the rear end of the retractable guard 32 is provided with a stop button 64 on its left side. Also, as best shown in FIGURES 1 and 2, the actuating lever 38 is provided at its upper end with a small spring catch 66, comprising a piece of spring steel fastened at one end by a rivet 68 to the lever 38 and adapted as shown in FIGURE 3 to have its front end sprung outwardly toward the left hand side of the retractable guard 32.

*Operation*

By reference to FIGURE 1, it will be noted that pressure applied to the thumb button 56 is effective to move the rod 58 downwardly to pivot the actuating lever 38 from the solid line, non-actuating position to the dotted line actuating position, pivoting about the pin 40. When this is done, the rubber covered drive roll 48, which normally lies in very close relationship, but not touching the back edge of the guard 32, is moved forward just enough to make contact with the guard. When the saw is running, in the 68 arrow or counterclockwise direction to make the teeth cut, the belt 50 is driven in the arrow 70 direction, FIGURE 1, to turn the V-pulley 46 counterclockwise and with it the shaft 44 and the rubber covered drive roll 48 similarly in a counterclockwise direction, as indicated by the small arrow on the drive roll 48 of FIGURES 1 and 2. Engagement of the drive roll 48 with the circular periphery of the guard 32 is effective to move the retractable guard in a clockwise direction up within the upper guard shield 30, as shown in FIGURE 2.

When the guard 32 reaches the upper limit of its travel, the stop button 64 passes the end of the catch 66 which snaps in behind the button to retain the guard in retracted position. At this point a small notch 72, FIGURE 1, that is formed near the front end of the periphery of guard 32, comes into alignment with the drive roll 48, as best shown in FIGURE 2, to disengage the drive roll from the back side of the retractable guard 32 and prevent wear, inasmuch as the drive roll 48 is rotating all during the time the saw blade is actuated.

From the foregoing, it will be observed that the guard 32 can be retracted at the will of the operator so that it is not necessary that the saw be forced into the stock so that the stock can retract the guard 32; however, this normal function is not disturbed by the present invention. Thus the present invention is particularly useful in "tight" work, as previously mentioned.

To deactivate the retractor and permit the guard 32 to return to its normal position, as shown in FIGURE 1, the operator simply lifts his thumb from the button 56 and then the spring 63 forces the button upwardly and carries with it the actuating lever 38. This action is effective to lift the spring catch 66 upwardly as shown in dotted outline in FIGURE 2, above the stop button 64. Also, the drive roll 48 is lifted backwardly out of engagement with the back edge of the guard 32 and, even though the saw may be still running, the guard 32 will be released to freely return in a reverse direction to its normal guarding position. To repeat the operation and lift the guard again at any time, it is merely necessary to start the saw so as to turn drive roll 48; and the button 56 is then depressed to the FIGURE 2 position to actuate the retractor.

Advantages and Convenience

From the foregoing, it will be observed that retraction of a saw guard in accordance with the present invention requires merely thumb pressure on a conveniently positioned push button, placed adjacent the switch trigger 18 so that it can be reached without the operator having to move his hand from a saw operating position on the handle 16. Where, as working in close corners or the like, the guard is in the way to prevent the very bottom of the saw being used to start a cut, the operator merely presses the button 56 and the guard is retracted. This provides a substantially advanced safety feature in saws utilizing the present device over those having a guard that is retracted only when it engages the stock. When cutting in tight corners without the present invention, it will be obvious that the guard must either be removed or that the operator must reach around with his free hand and pull it back. Obviously the latter is a very dangerous procedure and many hands have been seriously injured as a result.

Thus, in accordance with the present invention, all of the safety features of the saw guard are retained while new safety features are added. Thus the convenience of operating a saw without a guard is provided for these situations where such procedure is required.

It will also be observed from the foregoing that the device of the present invention is simply manufactured, yet ingenious in its application to power saws of the present art. The present mechanism, consisting of few parts of a compact nature are substantially completely concealed within the upper saw guard and do not interfere with normal saw operation.

It should be pointed out with regard to the operation of the device, that when the actuating lever 38 is moved downwardly to pivot the drive roll 48 forward, the tension of the belt 50 is reduced very slightly, yet not enough to prevent efficient operation of the drive roll to retract the guard 32. In this condition, it will be seen that strain is removed from the bearings 42 and from the belt 50 itself to provide a unit of long operating life and greater efficiency.

Additionally, it should be pointed out that the actuating button of the present device is in such a position that normal reaction of the hand such as a sudden jerk, shock or jamming of the saw will tend to disengage the thumb from the actuating button. This will automatically allow the guard to return to a normal guarding position. Also, if the saw is accidentally dropped the thumb is removed from the actuating button to permit the guard to be returned to a normally guarding position.

Having thus described my invention, I claim:

1. In a powered hand saw having a housing with a drive shaft carrying a rotatable arbor adapted to support a circular saw blade, means in the housing for rotating the drive shaft and the saw blade in a direction toward the stock to be cut, the housing supporting an upper blade guard in fixed position overlying a portion of the blade, a movable guard movable through an arc around the drive shaft and movable from a guarding position surrounding a lower portion of the blade into a nonguarding position within the upper fixed guard, the movable guard having a substantially circular outer periphery, the improvement of a lever, said lever having one end pivotally mounted to the housing, a drive wheel journaled on said lever and positioned with its periphery adjacent the periphery of the movable guard, means for rotating said drive wheel, means for pivotally moving said lever to carry the periphery of said drive wheel into engagement with the periphery of the movable guard, and means for rotating said drive wheel in a direction to move the movable guard out of guarding relation to the lower portion of said blade.

2. In an electrically powered hand saw having a housing carrying a motor and a rotatable arbor adapted to support a circular blade in cutting relation, with an upper housing overlying the upper portion of the blade and a lower movable guard adapted to move around the saw blade periphery and into the upper housing, the lower movable guard having a circular periphery, the improvement of an arcuate lever lying within said upper guard housing and pivotally mounted near one end to said upper guard housing, a drive wheel carried by said arcuate lever and having its periphery positioned adjacent the periphery of said arcuately movable guard, means for driving said drive wheel from the motor, and means for pivoting said arcuate lever to move said drive wheel into engagement with the periphery of said arcuately movable guard, whereby the guard is moved into a retracted position within the upper housing.

3. In an electrically powered hand saw having a housing carrying a motor and a rotatable arbor adapted to support a circular blade in cutting relation, with an upper fixed guard overlying the upper portion of the blade and a lower movable guard adapted to move around the saw blade periphery and into the upper fixed guard, the improvement of a lever lying within said upper fixed guard and pivotally mounted to said upper fixed guard, a drive wheel rotatably journaled on said lever and having its periphery positioned adjacent the periphery of said arcuately movable guard, means drivingly connecting said drive wheel and the motor, and means for pivoting said lever to move said drive wheel into engaging relation with the periphery of said arcuately movable guard whereby said arcuately movable guard is moved into a retracted position within said upper fixed guard.

4. In an electrically powered hand saw having a housing carrying a motor and a rotatable shaft carrying an arbor adapted to mount a circular cutting blade to be driven by said motor, the casing supporting an upper blade guard in fixed overlying relation to the upper portion of the blade, and a lower guard mounted for circular movement from a position underlying a lower portion of the blade to a position within the upper guard to expose the lower portion of the blade, the improvement of a stop member on the upper end of the lower movable guard, a clearance notch on the periphery on the lower end of the lower movable guard, a lever lying within said upper blade guard and having one end pivotally mounted to said upper guard, a latch element on said lever and spaced from said pivoted end, a drive wheel journaled on said lever and movable by said lever from a non-engaging position adjacent the periphery of the lower guard to a position engaging the periphery of the lower guard, and means for pivoting said lever in a manner to carry said drive wheel between non-engaging and engaging positions with respect to the swingable guard, and means for rotating said drive shaft from the saw motor in a direction whereby engagement of the drive wheel with the periphery of the lower guard is effective to move said lower guard to a retracted position within the upper guard, whereby said stop member on said lower guard engages said lever catch to retain the lower guard in retracted position and said clearance notch is moved into alignment with said drive wheel to prevent wear on said drive wheel while the lower guard is in a retracted position.

5. In an electrically powered hand saw having a housing carrying a motor and a rotatable shaft carrying an arbor adapted to mount a circular cutting blade to be driven by the motor, the housing supporting an upper fixed blade guard in overlying relation to the upper portion of the blade, and a movable guard mounted for circular movement between a position underlying a lower portion of the blade to a position within the upper guard and exposing the lower portion of the blade, the improvement of a stop member on the lower movable guard, a lever within said fixed guard and pivotally mounted to said fixed guard, a latch element on said lever, a drive wheel journaled on said lever and movable by said lever from an non-engaging position adjacent the periphery of the lower guard to a position engaging the periphery of the lower guard, and means for pivoting said lever in a manner to carry said drive wheel between said non-engaging and engaging positions, and means for rotating said drive wheel from the saw motor in a direction whereby engagement of the drive wheel with the periphery of the movable guard is effective to move said movable guard to a retracted position within the upper guard, whereby said stop member on said movable guard engages said lever catch to retain the movable guard in retracted position.

6. In a power saw, a housing, a motor carried within said housing, a saw arbor shaft journaled in said housing and operably connected to said motor, said shaft having a portion extending from said housing, an arbor carried on said shaft portion and adapted to rotatably mount a circular cutting blade, a handle on said housing and carrying a switch for actuating said motor, a fixed guard connected to said housing in overlying relationship to said blade, a movable guard mounted for movement between a position underlying a portion of said blade and a position overlying said blade to expose the lower portion of said blade for cutting, said movable guard having a circular periphery and a clearance notch in said periphery, a lever pivotally mounted to said fixed guard for movement in a plane parallel to said blade, a drive roll rotatably journaled on said lever and positioned adjacent the periphery of said movable guard, means for moving said lever toward and away from said arbor whereby said drive roll is moved into and out of engagement with said periphery of said movable guard, a pulley connected to said drive wheel and a pulley connected to said saw arbor shaft with a belt between to drive said drive wheel upon actuation of said saw blade, stop means on said movable guard, a latch element on said lever, said latch element being aligned with said stop means when said lever is pivoted toward said saw arbor, and an actuating button carried on said handle adjacent said switch and connected to said lever whereby pressure on said actuating button during rotation of said shaft by said motor is effective to pivot said lever and move said drive wheel into engagement with said movable guard and move the guard to a retracted position where said stop means engages said latch to retain said movable guard in a retracted position and said clearance notch in the periphery of said movable guard is brought into alignment with said drive wheel to disengage the drive wheel and thus prevent wear on said drive wheel while said movable guard is in the retracted position.

References Cited in the file of this patent
UNITED STATES PATENTS

| 1,738,896 | Hansen | Dec. 10, 1929 |
| 2,342,052 | Jimerson et al. | Feb. 15, 1944 |
| 2,544,461 | Leitzel | Mar. 6, 1951 |
| 2,637,353 | Hyslop | May 5, 1953 |
| 2,722,246 | Arnoldy | Nov. 1, 1955 |
| 2,737,985 | Utz | Mar. 13, 1956 |